United States Patent [19]

Pfeifer

[11] Patent Number: 4,624,431
[45] Date of Patent: Nov. 25, 1986

[54] LOCKING CLIP FOR BAR BRACKET
[75] Inventor: William Pfeifer, Springdale, Pa.
[73] Assignee: Armstrong Store Fixture Corporation, Pittsburgh, Pa.
[21] Appl. No.: 783,310
[22] Filed: Oct. 2, 1985
[51] Int. Cl.⁴ .............................................. E04G 5/06
[52] U.S. Cl. .................................. 248/215; 248/221.3
[58] Field of Search ...................... 248/214, 215, 221.3, 248/222.2, 340, 223.3, 225.1, 231.8, 303, 251; 24/221.3, 222.2; 211/59.1, 123

[56] References Cited

U.S. PATENT DOCUMENTS

| | | |
|---|---|---|
| 884,361 | 4/1908 | Broga . |
| 2,665,869 | 1/1954 | Samuels . |
| 2,869,201 | 1/1959 | Wolff . |
| 3,965,540 | 6/1976 | Moore . |
| 4,017,943 | 4/1977 | Moore . |
| 4,036,761 | 7/1977 | Rankin ............................ 24/336 X |
| 4,340,144 | 7/1982 | Cousins ....................... 248/222.2 X |
| 4,449,686 | 5/1984 | Kersey . |
| 4,531,331 | 7/1985 | Itagaki ......................... 248/222.2 X |

Primary Examiner—J. Franklin Foss
Attorney, Agent, or Firm—Parmelee, Miller, Welsh & Kratz

[57] ABSTRACT

A clip adapted for mounting a hanger arm to a crossbar that comprises a vertical wall, a substantially horizontal lip integral with the vertical wall at its base extending forwardly from the vertical wall a pair of walls integral with said vertical wall extending forwardly along the vertical edges and downwardly from adjacent the top edge of the vertical wall, the pair of walls being shorter in length than the length of the vertical wall, the pair of walls being provided with a first pair of substantially horizontal stop members integral with the pair of walls and extending laterally from the pair of walls, the pair of walls being further provided with a second pair of substantially horizontal stop members integral with the pair of walls and extending laterally adjacent the upper end of the pair of walls.

18 Claims, 7 Drawing Figures

LOCKING CLIP FOR BAR BRACKET

FIELD OF THE INVENTION

This invention is directed to a novel clip for attaching on a hanger arm to facilitate mounting of the hanger arm onto a crossbar and to facilitate removal of said hanger arm from the crossbar.

BACKGROUND OF THE INVENTION

It has become common in merchandising today to package items individually on cards, or otherwise with grommets which are made to be slid onto hooks, so that the merchandise may be displayed and removed from the display easily. The hanger arms on which the merchandise is displayed are often mounted on a horizontal crossbar which, in turn, is mounted on wall supports. It is often necessary to rearrange, or move, the display fixture and the merchandise theron. Since the hanger arms are generally not fixedly attached to the crossbar, the means for such attachment should, therefore, be designed to facilitate mounting of the hanger arm to the crossbar and for easy and quick removal of the hanger arm from the crossbar in order to assist rearrangement of merchandise or movement of the display fixture to another location. The novel clip defined and claimed herein is designed to enable one to quickly and easily attach a hanger arm to a crossbar and, similarly, to remove the hanger arm therefrom.

A number of devices have been patented that have been designed to mount assemblies to a crossbar. Thus, Broga in U.S. Pat. No. 884,361, dated Apr. 14, 1908, discloses a meat hook having a bracket which hangs on a horizontal bar provided with a pivoted member spring biased to engage the underside of the bar. Samuels in U.S. Pat. No. 2,665,869, dated Jan. 12, 1954, discloses a bracket which hooks over the top of a flat horizontal bar and has a wedging lip which snaps onto the bottom of the bar. A hanger arm is fixedly attached to the bracket. In U.S. Pat. No. 2,869,201, dated Jan. 20, 1959, Wolff discloses a metal clip having a hook at the top which engages the top edge of a flat bar, a first integral spring portion which snaps over the bottom of the bar and engages the lower front face of the bar and a tongue which engages the bottom of the bar. Moore in U.S. Pat. No. 3,965,540, dated June 29, 1976, discloses a plastic clip for mounting crossbars, used to support hooks for displaying merchandise, to brackets mounted on a wall. In U.S. Pat. No. 4,449,686 to Kersey, dated May 22, 1984, there is shown a bracket, fixedly attached to a hanger arm, which hangs on a square tubular bar and is locked in place by a spring-biased pin which engages the underside of the tubular bar.

From what will be shown hereinafter, it will be apparent that none of these references, or any combination thereof, discloses or teaches the novel clip herein which fits onto a bracket of a hanger arm to facilitate attachment, and removal, of said hanger arm to a crossbar.

SUMMARY OF THE INVENTION

The present invention is directed to a novel clip adapted to facilitate mounting a hanger arm to a crossbar comprising a vertical wall, a substantially horizontal lip integral therewith at the base thereof extending forwardly therefrom, a pair of walls integral with said vertical wall extending forwardly therefrom along the vertical edges thereof and downwardly from adjacent the top edge thereof, said pair of walls being shorter in length than the length of said vertical wall, said pair of walls being provided with a first pair of substantially horizontal stop members integral therewith and extending laterally therefrom, said pair of walls being further provided with a second pair of substantially horizontal stop members integral therewith and extending laterally therefrom, said pair of walls being further provided with a second pair of substantially horizontal stop members integral therewith and extending laterally therefrom adjacent the upper end thereof.

DETAILED DESCRIPTION OF THE PREFERRED EMBODIMENT

Figure 1:
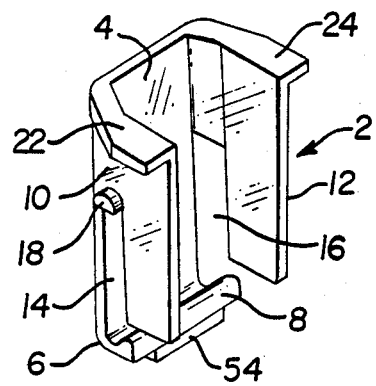
FIG. 1 is a view in perspective of a preferred embodiment of the novel clip of the present invention.
Figure 2:
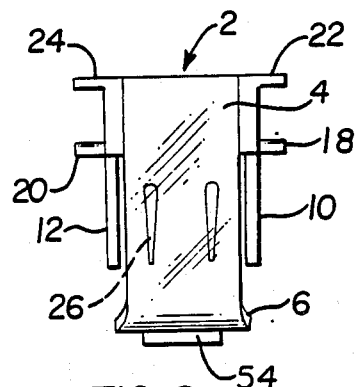
FIG. 2 is a rear elevation of the novel clip of FIG. 1.
Figure 3:
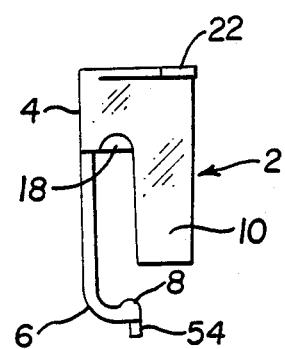
FIG. 3 is a side elevation of the novel clip of FIG. 1.

The unique structure of a preferred embodiment of the novel clip 2 of the present invention can best be seen in FIGS. 1, 2, 3 and 4. Clip 2 is provided with a rear vertical wall 4 and a substantially horizontal retaining lip 6 integral therewith at the base thereof and extending forwardly therefrom. In order to facilitate retainment of a crossbar on said lip 6, the free end of said lip can be provided with an abutment 8 thereon.

Clip 2 is also provided with a pair of spaced apart walls 10 and 12 integral with rear vertical wall 4 extending forwardly therefrom along the vertical edges thereof and downwardly from adjacent the top edge thereof. Walls 10 and 12 are preferably disposed at about a 90° angle with rear vertical wall 4. It will be seen that the pair of walls 10 and 12 are preferably shorter in length that the length of rear vertical wall 4. Each of walls 10 and 12 is provided with spaced apart, horizontally aligned, elongated vertical slots 14 and 16, respectively, adjacent rear vertical wall 4, extending from a level intermediate the top and base of each of walls 10 and 12 through the base thereof.

Walls 10 and 12 are provided with a first pair of substantially horizontal stop members 18 and 20, repectively, integral therewith and extending laterally therefrom intermediate the top and base thereof. Stop members 18 and 20 are positioned vertically above vertical slots 14 and 16, preferably immediately above vertical slots 14 and 16. Each of walls 10 and 12 is further provided with a second pair of substantially horizontal stop members 22 and 24, respectively, integral therewith and extending laterally therefrom adjacent the upper end thereof. Preferably, stop members 22 and 24 are positioned at the top of walls 10 and 12. Since the clip 2 herein is made of a flexible material, such as plastic, the rear vertical wall 4 is preferably provided with elongated indentations 26 to add additional rigidity thereto.

Figure 4:
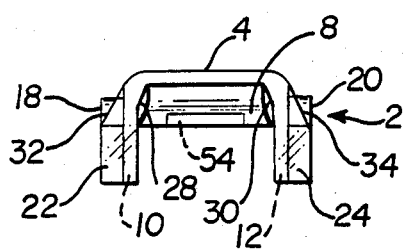
FIG. 4 is a view in top plan of the novel clip of FIG. 1.

As shown in FIG. 4, the portions 28 and 30 of walls 10 and 12 adjacent rear vertical wall 4 are somewhat enlarged and slope inwardly toward rear vertical wall 4 to control stiffness between walls 10 and 12. Additionally, said second pair of stop members 22 and 24 are preferably flanged and extend laterally outwardly along a substantial portion of the upper end of walls 10 and 12. Preferably stop members 22 and 24 are also beveled at the outer edges 32 and 34 thereof so that they slope inwardly from an intermediate point thereon toward the vertical wall 4 to facilitate mounting of said clip 2 into a bracket, as will be shown hereinafter.

Figure 5:
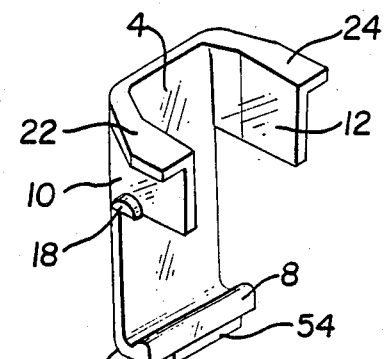
FIG. 5 is a view in perspective of another embodiment of the novel clip of the present invention.

The embodiment of FIG. 5 is identical to that of FIGS. 1, 2, 3 and 4, except that the walls 10 and 12 do not extend downwardly to the same extent as they do in the preferred embodiment. Thus, no spaced apart, horizontally aligned vertical slots 14 and 16 are present therein as in the clip of the preferred embodiment.

A further attraction of novel clip 2 herein resides in the fact that the same can be easily molded and/or stamped out from a unitary piece into the above-defined configuration.

Figure 6:
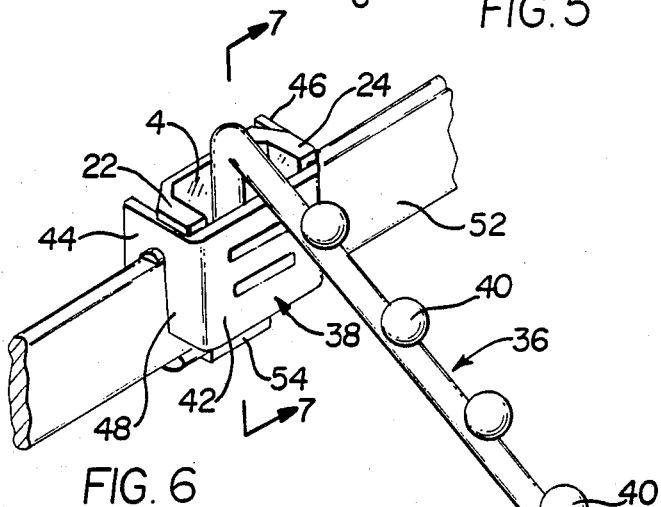
FIG. 6, is a view in perspective of the novel clip of FIG. 1 mounted on a bracket of a hanger arm and the attachment of the assembly to a crossbar.
Figure 7:
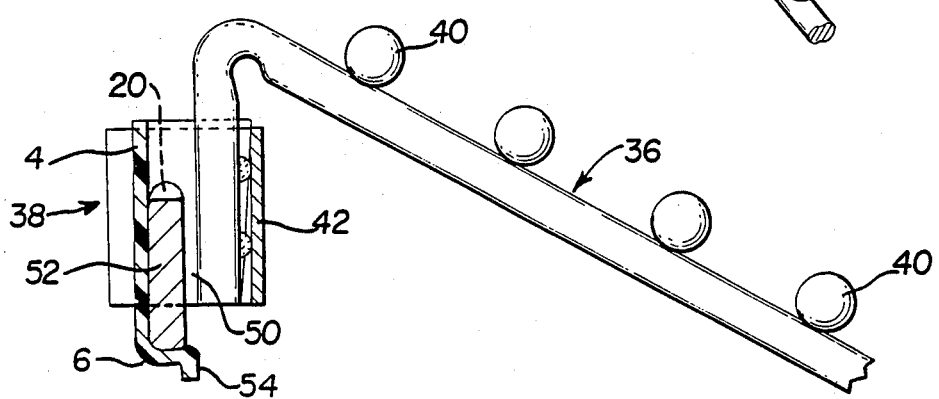
FIG. 7 is a vertical section taken along line 6—6 of FIG. 6.

Referring to FIGS. 6 and 7, there is shown a hanger arm 36 provided with a bracket 38 for mounting the novel clip 2 thereto. The hanger arm, as shown, is provided, optionally, with projections 40 on the upper surface thereof for supporting hooks of a garment hanger. Bracket 38 for mounting clip 2 thereon comprises a vertically disposed wall 42 securely attached to hanger arm 36 using any suitable means. In the embodiment shown in FIGS. 6 and 7, a portion of hanger arm 36 is disposed downwardly and is, securely attached to the inner face of wall 42 but, if desired, can be securely attached to the outer face of wall 42. Bracket 38 also includes a pair of walls 44 and 46 integral with vertically disposed wall 42 extending outwardly therefrom along the vertical edges thereof. Walls 44 and 46 are preferably disposed at about a 90° angle with vertically disposed wall 42. The distance between the inner surfaces of walls 44 and 46 is just slightly greater than the distance between the outer surfaces of walls 10 and 12 of clip 2, so that when clip 2 is positioned in bracket 38 between the walls 44 and 46, it will preferably fit snugly therebetween.

Walls 44 and 46 are also provided with a pair of spaced apart, horizontally aligned, elongated vertical slots 48 and 50, extending from a level intermediate the top and base thereof through the base thereof, so that when clip 2 is mounted within bracket 38, as dscribed hereinafter, vertical slots 14, 16, 48 and 50 are in horizontal alignment and in position to receive a crossbar 52. Crossbar 52 can be mounted in any suitable manner to wall standards of a merchandising display, for example, as in U.S. Pat. No. 3,965,540 to Moore, referred to hereinabove.

Clip 2 can be easily mounted within bracket 34 by making the clip from a substantially rigid material but having resilience or "give", for example, a metal, such as spring steel, but preferably from a plastic material, such as a polycarbonate. To mount clip 2 within bracket 38, the clip is positioned beneath bracket 38 so that stop members 18 and 20 are in vertical alignment with elongated slots 48 and 50 of bracket 38. The lower ends of walls 10 and 12 of clip 2 are then flexed toward each other until beveled edges 32 and 34 of the flanged stop members 22 and 24 are in vertical alignment with the inner surfaces of bracket 38. The clip is then moved upwardly into bracket 38, resulting in upward movement of stop members 18 and 20 in slots 48 and 50. By the time stop members 18 and 20 abut the upper portions of slots 48 and 50, stop members 22 and 24 will escape the confines of bracket 38, tension on walls 10 and 20 of clip 2 will be relieved and the lower edges of flanged stop members 22 and 24 will rest on the upper edges of walls 10 and 12. Walls 10 and 12 of clip 2 will then be horizontally aligned with and in close proximity to walls 44 and 46 of bracket 38. The upper portions of walls 44 and 46, disposed between stop members 18 and 20 and stop members 22 and 24, will fit snugly therebetween and will greatly assist in maintaining clip 2 firmly within bracket 38. To remove clip 2 from bracket 38, the installment procedure is simply reversed.

As shown in FIG. 7, the hanger arm assembly is easily mounted on crossbar 52. Thus, the hanger arm assembly is placed above crossbar 52 with the lower front portion of the bracket 38 in contact with the upper surface of the crossbar. The hanger arm assembly is then moved forwardly, thereby flexing the lower portion of rear vertical wall 4 of clip 2 rearwardly until crossbar 52 is in vertical alignment with slots 14, 16, 48 and 50. Downward movement of the hanger arm assembly will then result in engagement of the crossbar with said slots. Rear vertical wall 4 of clip 2 will then return to its normal position and lip 6 will engage the underside of crossbar 52, thereby firmly holding the hanger arm assembly to the crossbar, as shown in FIG. 7. The hanger bar assembly can easily be removed from crossbar 52 by merely reversing the procedure outlined above. Thus, the bottom portion of clip 2 is flexed rearwardly until lip 6 is no longer in engagement with the underside of crossbar 52. The hanger bar assembly is then moved upwardly out of engagement with crossbar 52. To facilitate rearward movement of the lower portion of rear vertical wall 4 away from crossbar 52, lip 6 can be provided with a downwardly extending portion 54 integral therewith.

Although in the embodiments hereinabove described, horizontal stop members 18, 20, 22 and 24 of clip 2 extend substantially horizontally outwardly from walls 10 and 12, and the clip has been mounted within bracket 38, it is within the purview of the invention herein to provide clip 2 with horizontal stop members 18, 20, 22 and 24 that extend substantially horizontally inwardly from walls 10 and 12. In such case clip 2 would have a wider rear vertical wall 4 and would be mounted on the outside of bracket 38. Each of the stop members would then be similarly positioned with respect to bracket 38 as they were in the embodiments previously described.

Obviously, many modifications and variations of the invention, as hereinabove set forth, can be made without departing from the spirit thereof, and therefore only such limitations should be imposed as are indicated in the appended claims.

What is claimed is:

1. A novel clip adapted for mounting a hanger arm to a crossbar comprising a vertical wall, a substantially horizontal lip integral therewith at the base thereof extending forwardly therefrom, a pair of walls integral with said vertical wall extending forwardly therefrom along the vertical edges thereof and downwardly from adjacent the top edge thereof, said pair of walls being shorter in length that the length of said vertical wall, said pair of walls being provided with a first pair of substantially horizontal stop members integral therewith and extending laterally therefrom, said pair of walls being further provided with a second pair of substantially horizontal stop members integral therewith and extending laterally therefrom adjacent the upper end thereof.

2. The clip of claim 1 wherein said clip is composed of a substantially rigid but resilient material.

3. The clip of claim 1 wherein said second pair of stop members extend laterally along a substantial portion of the upper end of said pair of walls and are beveled inwardly at the outer edges thereof so that they slope inwardly from an intermediate point thereon toward said vertical wall.

4. A novel clip adapted for mounting a hanger arm to a crossbar comprising a vertical wall, a substantially horizontal lip integral therewith at the base thereof extending forwardly therefrom, a pair of walls integral with said vertical wall extending forwardly therefrom along the vertical edges thereof and downwardly from adjacent the top edge thereof, said pair of walls being shorter in length than the length of said vertical wall, each wall of said pair of walls being provided with spaced apart, horizontally aligned, elongated vertical slots adjacent said vertical wall extending from a level intermediate the top and base of said pair of walls through the base thereof, said pair of walls being provided with a first pair of substantially horizontal stop members integral therewith and extending laterally therefrom intermediate the top and base thereof positioned vertically above said elongated vertical slots, said pair of walls being further provided with a second pair of substantially horizontal stop members integral therewith and extending laterally therefrom adjacent the upper end thereof.

5. The clip of claim 4 wherein said second pair of stop members are positioned at the top of said pair of walls.

6. The clip of claim 5 wherein said first pair of stop members are positioned immediately above said elongated vertical slots.

7. The clip of claim 4 wherein said second pair of stop members extend laterally along a substantial portion of the upper end of said pair of walls and are beveled inwardly at the outer edges thereof so that they slope inwardly from an intermediate point thereon toward said vertical wall.

8. The clip of claim 4 wherein said clip is composed of a substantially rigid but resilient material.

9. In combination, (I) a hanger arm provided with a bracket for mounting a clip therein, said bracket comprising a vertically disposed wall securely attached to the hanger arm, a pair of walls integral therewith extending outwardly therefrom along the vertical edges thereof, said pair of walls provided with spaced apart, horizontally aligned, elongated vertical slots extending from a level intermediate the top and base thereof through the base thereof, and (II) a clip for mounting the bracket to a crossbar mounted within said bracket comprising a vertical wall, a substantially horzontal lip integral therewith at the base thereof extending forwardly therefrom, a pair of walls integral with said latter vertical wall extending forwardly therefrom along the vertical edges thereof and downwardly from adjacent the top edge thereof, said latter pair of walls being shorter in length than the length of said latter vertical wall, said latter pair of walls being provided with a first pair of substantially horizontal stop members integral therewith and extending latterly therefrom, said latter pair of walls being further provided with a second pair of substantially horizontal stop members integral therewith and extending latterly therefrom adjacent the upper end thereof, said first pair of horizontal stop members being disposed within said elongated slots in said bracket and said second pair of horizontal stop members being in abutting relationship with the upper surface of said pair of walls of said bracket, said pair of walls of said bracket being horizontally aligned and in close proximity to said pair of walls of said clip.

10. The combination of claim 9 wherein said clip comprises a vertical wall, a substantially horizontal lip integral therewith at the base thereof extending forwardly therefrom, a pair of walls integral with said vertical wall extending forwardly therefrom along the vertical edges thereof and downwardly adjacent the top edge thereof, said latter pair of walls being shorter in length than the length of said vertical wall, each wall of said latter pair of walls being provided with spaced apart, horizontally aligned, elongated vertical slots adjacent said vertical wall extending from a level intermediate the top and base of said latter pair of walls through the base thereof, said latter pair of walls being provided with a first pair of substantially horizontal stop members integral therewith and extending laterally therefrom intermediate the top and base thereof positioned vertically above said elongated vertical slots, said latter pair of walls being further provided with a second pair of substantially horizontal stop members integral therewith and extending laterally therefrom adjacent the upper end thereof, all of said above defined vertical slots in said bracket and in said clip being in horizontal alignment with each other so that a crossbar can be disposed therein, said first pair of horizontal stop members being disposed within said elongated vertical slots in said bracket and said second pair of horizontal stop members being in abutting relationship with the upper surface of said pair of walls of said bracket, said pair of walls of said bracket being horizontally aligned with an inclosed proximity to said pair of walls of said clip.

11. The combination of claim 9 wherein said clip is composed of a substantially rigid but resilient material.

12. The combination of claim 10 wherein said clip is composed of a substantially rigid but resilient material.

13. The combination of claim 9 wherein said vertical wall of said clip and said vertical wall of said bracket are horizontally and spacially disposed away from each other.

14. The combination of claim 10 wherein said vertical wall of said clip and said vertical wall of said bracket are horizontally and spacially disposed away from each other.

15. The combination of claim 9 wherein said second pair of stop members of said clip extend laterally along a substantial portion of the upper and of said pair of walls of said clip and are beveled inwardly at the outer edges thereof so that they slope inwardly from an intermediate point thereon toward said vertical wall.

16. The combination of claim 10 wherein said second pair of stop members of said clip extend laterally along a substantial portion of the upper end of said pair of walls of said clip and are beveled inwardly at the outer edges thereof so that they slope inwardly from an intermediate point thereon toward said vertical wall.

17. The combination of claim 15 wherein said pair of walls of said clip are disposed within said walls of said bracket.

18. The combination of claim 16 wherein said pair of walls of said clip are disposed within said walls of said bracket.

* * * * *